United States Patent
Horn (10) Patent No.: US 9,448,738 B2
(45) Date of Patent: *Sep. 20, 2016

(54) COMPRESSION AND FORMATTING OF DATA FOR DATA STORAGE SYSTEMS

(71) Applicant: Western Digital Technologies, Inc., Irvine, CA (US)

(72) Inventor: Robert L. Horn, Yorba Linda, CA (US)

(73) Assignee: Western Digital Technologies, Inc., Irvine, CA (US)

(*) Notice: Subject to any disclaimer, the term of this patent is extended or adjusted under 35 U.S.C. 154(b) by 95 days.

This patent is subject to a terminal disclaimer.

(21) Appl. No.: 13/902,504

(22) Filed: May 24, 2013

(65) Prior Publication Data

US 2014/0281146 A1  Sep. 18, 2014

Related U.S. Application Data

(60) Provisional application No. 61/798,909, filed on Mar. 15, 2013.

(51) Int. Cl.
*G06F 12/02* (2006.01)
*G06F 3/06* (2006.01)
(Continued)

(52) U.S. Cl.
CPC .............. *G06F 3/064* (2013.01); *G06F 3/0608* (2013.01); *G06F 3/0656* (2013.01); *G06F 3/0688* (2013.01); *G06F 12/0871* (2013.01); *G06F 21/6218* (2013.01); *G11B 20/0021* (2013.01); *G11B 20/10527* (2013.01); *G11B 20/1217* (2013.01); *G06F 12/0246* (2013.01); *G06F 2212/1021* (2013.01);
(Continued)

(58) Field of Classification Search
CPC .............. G06F 3/064; G06F 12/0246; G06F 2212/401; G06F 3/0679; G06F 3/0608; G06F 11/08; G06F 3/0656; G06F 21/00; G06F 12/00; G06F 3/0688; G11B 20/1217; G11B 20/0021; G11B 20/10527
See application file for complete search history.

(56) References Cited

U.S. PATENT DOCUMENTS 5,465,186 A 11/1995 Bajorek et al.
5,861,661 A  1/1999 Tang et al.
(Continued)

FOREIGN PATENT DOCUMENTS

WO  2011-081898  7/2011

OTHER PUBLICATIONS

International Search Report and Written Opinion dated Aug. 13, 2014 from related PCT U.S. Appl. No. PCT/US20141026863, 10 pages.
(Continued)

*Primary Examiner* — Kevin Verbrugge
*Assistant Examiner* — Francisco Grullon
(74) *Attorney, Agent, or Firm* — Knobbe, Martens Olson & Bear, LLP (57) ABSTRACT

Embodiments of compression and formatting of data for data storage systems are disclosed. In some embodiments, a data storage system can compress fixed sized data before storing it on a media and format obtained variable sized compressed data for storing on the media that typically has fixed size storage granularity. One or more modules compress the incoming host data and create an output stream of fixed sized storage units that contain compressed data. The storage units are stored on the media. Capacity, reliability, and performance are thereby increased.

48 Claims, 5 Drawing Sheets

(51) Int. Cl.
*G11B 20/00* (2006.01)
*G11B 20/10* (2006.01)
*G11B 20/12* (2006.01)
*G06F 21/62* (2013.01)
*G06F 12/08* (2016.01)

(52) U.S. Cl.
CPC ............... *G06F 2212/1044* (2013.01); *G06F 2212/217* (2013.01); *G06F 2212/222* (2013.01); *G06F 2212/281* (2013.01); *G06F 2212/313* (2013.01)

(56) References Cited

U.S. PATENT DOCUMENTS

| | | | |
|---|---|---|---|
| 6,228,689 B1 | 5/2001 | Liu | |
| 6,351,352 B1 | 2/2002 | Khan et al. | |
| 6,381,099 B1 | 4/2002 | Mei | |
| 6,382,499 B1 | 5/2002 | Satoh et al. | |
| 6,614,623 B2 | 9/2003 | Nakamura et al. | |
| 6,639,757 B2 | 10/2003 | Morley et al. | |
| 6,656,772 B2 | 12/2003 | Huang | |
| 6,757,137 B1 | 6/2004 | Mei | |
| 6,856,556 B1 | 2/2005 | Hajeck | |
| 6,992,862 B2 | 1/2006 | Childers et al. | |
| 7,075,701 B2 | 7/2006 | Novotny et al. | |
| 7,126,857 B2 | 10/2006 | Hajeck | |
| 7,154,708 B2 | 12/2006 | Chhabra et al. | |
| 7,245,458 B2 | 7/2007 | Zhang et al. | |
| 7,298,593 B2 | 11/2007 | Yao et al. | |
| 7,359,154 B2 | 4/2008 | Yao et al. | |
| 7,372,669 B2 | 5/2008 | Deguchi et al. | |
| 7,375,874 B1 | 5/2008 | Novotny et al. | |
| 7,388,733 B2 | 6/2008 | Swanson et al. | |
| 7,394,139 B2 | 7/2008 | Park et al. | |
| 7,415,530 B2 | 8/2008 | Fallon | |
| 7,430,136 B2 | 9/2008 | Merry, Jr. et al. | |
| 7,440,236 B1 | 10/2008 | Bennin et al. | |
| 7,447,807 B1 | 11/2008 | Merry et al. | |
| 7,502,256 B2 | 3/2009 | Merry, Jr. et al. | |
| 7,509,441 B1 | 3/2009 | Merry et al. | |
| 7,515,240 B2 | 4/2009 | Lu et al. | |
| 7,525,769 B2 | 4/2009 | Yao et al. | |
| 7,596,643 B2 | 9/2009 | Merry, Jr. et al. | |
| 7,652,890 B2 | 1/2010 | Ohsawa et al. | |
| 7,653,778 B2 | 1/2010 | Merry, Jr. et al. | |
| 7,685,337 B2 | 3/2010 | Merry, Jr. et al. | |
| 7,685,338 B2 | 3/2010 | Merry, Jr. et al. | |
| 7,685,374 B2 | 3/2010 | Diggs et al. | |
| 7,697,102 B2 | 4/2010 | Hirakata et al. | |
| 7,706,538 B1 * | 4/2010 | Hughes et al. | ............ 380/269 |
| 7,733,712 B1 | 6/2010 | Walston et al. | |
| 7,764,467 B2 | 7/2010 | Hanya et al. | |
| 7,765,373 B1 | 7/2010 | Merry et al. | |
| 7,876,664 B2 | 1/2011 | Tsukagoshi et al. | |
| 7,898,855 B2 | 3/2011 | Merry, Jr. et al. | |
| 7,912,991 B1 | 3/2011 | Merry et al. | |
| 7,936,603 B2 | 5/2011 | Merry, Jr. et al. | |
| 7,962,792 B2 | 6/2011 | Diggs et al. | |
| 8,015,692 B1 | 9/2011 | Zhang et al. | |
| 8,030,576 B2 | 10/2011 | Kamei et al. | |
| 8,054,879 B2 | 11/2011 | Fallon et al. | |
| 8,078,918 B2 | 12/2011 | Diggs et al. | |
| 8,090,899 B1 | 1/2012 | Syu | |
| 8,090,936 B2 | 1/2012 | Fallon et al. | |
| 8,095,851 B2 | 1/2012 | Diggs et al. | |
| 8,108,692 B1 | 1/2012 | Merry et al. | |
| 8,111,483 B2 | 2/2012 | Arai | |
| 8,122,185 B2 | 2/2012 | Merry, Jr. et al. | |
| 8,127,048 B1 | 2/2012 | Merry et al. | |
| 8,135,903 B1 | 3/2012 | Kan | |
| 8,151,020 B2 | 4/2012 | Merry, Jr. et al. | |
| 8,161,227 B1 | 4/2012 | Diggs et al. | |
| 8,166,245 B2 | 4/2012 | Diggs et al. | |
| 8,189,407 B2 * | 5/2012 | Strasser et al. | ......... 365/189.09 |
| 8,243,525 B1 | 8/2012 | Kan | |
| 8,254,172 B1 | 8/2012 | Kan | |
| 8,261,012 B2 | 9/2012 | Kan | |
| 8,266,496 B2 * | 9/2012 | Flynn et al. | ................. 714/758 |
| 8,296,625 B2 | 10/2012 | Diggs et al. | |
| 8,312,207 B2 | 11/2012 | Merry, Jr. et al. | |
| 8,316,176 B1 | 11/2012 | Phan et al. | |
| 8,341,339 B1 | 12/2012 | Boyle et al. | |
| 8,375,151 B1 | 2/2013 | Kan | |
| 8,392,635 B2 | 3/2013 | Booth et al. | |
| 8,397,107 B1 | 3/2013 | Syu et al. | |
| 8,407,449 B1 | 3/2013 | Colon et al. | |
| 8,423,722 B1 | 4/2013 | Deforest et al. | |
| 8,433,858 B1 | 4/2013 | Diggs et al. | |
| 8,443,167 B1 | 5/2013 | Fallone et al. | |
| 8,447,920 B1 | 5/2013 | Syu | |
| 8,458,435 B1 | 6/2013 | Rainey, III et al. | |
| 8,478,930 B1 | 7/2013 | Syu | |
| 8,489,854 B1 | 7/2013 | Colon et al. | |
| 8,503,237 B1 | 8/2013 | Horn | |
| 8,521,972 B1 | 8/2013 | Boyle et al. | |
| 8,549,236 B2 | 10/2013 | Diggs et al. | |
| 8,583,835 B1 | 11/2013 | Kan | |
| 8,601,311 B2 | 12/2013 | Horn | |
| 8,601,313 B1 | 12/2013 | Horn | |
| 8,612,669 B1 | 12/2013 | Syu et al. | |
| 8,612,804 B1 | 12/2013 | Kang et al. | |
| 8,615,681 B2 | 12/2013 | Horn | |
| 8,638,602 B1 | 1/2014 | Horn | |
| 8,639,872 B1 | 1/2014 | Boyle et al. | |
| 8,683,113 B2 | 3/2014 | Abasto et al. | |
| 8,700,834 B2 | 4/2014 | Horn et al. | |
| 8,700,950 B1 | 4/2014 | Syu | |
| 8,700,951 B1 | 4/2014 | Call et al. | |
| 8,706,985 B1 | 4/2014 | Boyle et al. | |
| 8,707,104 B1 | 4/2014 | Jean | |
| 8,713,066 B1 | 4/2014 | Lo et al. | |
| 8,713,357 B1 | 4/2014 | Jean et al. | |
| 8,719,531 B2 | 5/2014 | Strange et al. | |
| 8,724,422 B1 | 5/2014 | Agness et al. | |
| 8,725,931 B1 | 5/2014 | Kang | |
| 8,745,277 B2 | 6/2014 | Kan | |
| 8,751,728 B1 | 6/2014 | Syu et al. | |
| 8,769,190 B1 | 7/2014 | Syu et al. | |
| 8,769,232 B2 | 7/2014 | Suryabudi et al. | |
| 8,775,720 B1 | 7/2014 | Meyer et al. | |
| 8,782,327 B1 | 7/2014 | Kang et al. | |
| 8,788,778 B1 | 7/2014 | Boyle | |
| 8,788,779 B1 | 7/2014 | Horn | |
| 8,788,880 B1 | 7/2014 | Gosla et al. | |
| 8,793,429 B1 | 7/2014 | Call et al. | |
| 2001/0017749 A1 | 8/2001 | Stefansky | |
| 2005/0030670 A1 | 2/2005 | Ando et al. | |
| 2005/0195528 A1 * | 9/2005 | Bennin | ............... G11B 5/4846 360/234.5 |
| 2005/0204081 A1 | 9/2005 | Wang | |
| 2005/0243472 A1 | 11/2005 | Kamigama et al. | |
| 2006/0098347 A1 | 5/2006 | Yao et al. | |
| 2006/0146262 A1 | 7/2006 | Yu et al. | |
| 2006/0157869 A1 | 7/2006 | Huang et al. | |
| 2007/0246251 A1 | 10/2007 | Shiraishi et al. | |
| 2008/0002303 A1 | 1/2008 | Wang et al. | |
| 2008/0016281 A1 | 1/2008 | Gower et al. | |
| 2008/0068757 A1 | 3/2008 | Kamigama et al. | |
| 2008/0088975 A1 | 4/2008 | Bennin et al. | |
| 2008/0140724 A1 * | 6/2008 | Flynn et al. | ................. 707/104.1 |
| 2008/0225439 A1 | 9/2008 | Komura | |
| 2009/0151994 A1 | 6/2009 | Ohsawa et al. | |
| 2009/0190760 A1 | 7/2009 | Bojinov et al. | |
| 2009/0211789 A1 | 8/2009 | Yeates et al. | |
| 2009/0253233 A1 | 10/2009 | Chang et al. | |
| 2010/0118444 A1 | 5/2010 | Rothenberg et al. | |
| 2010/0174849 A1 | 7/2010 | Walston et al. | |
| 2010/0176827 A1 | 7/2010 | Yamazaki et al. | |
| 2010/0188778 A1 | 7/2010 | Castagna | |
| 2010/0195474 A1 | 8/2010 | Tsukuda et al. | |
| 2010/0228800 A1 | 9/2010 | Aston et al. | |
| 2010/0250793 A1 | 9/2010 | Syu | |
| 2011/0099323 A1 | 4/2011 | Syu | |
| 2011/0235697 A1 | 9/2011 | Fallon et al. | |

(56) References Cited

U.S. PATENT DOCUMENTS

| | | |
|---|---|---|
| 2011/0252183 A1 | 10/2011 | Cho et al. |
| 2011/0282849 A1 | 11/2011 | Williams et al. |
| 2011/0283049 A1 | 11/2011 | Kang et al. |
| 2011/0317309 A1 | 12/2011 | Shum et al. |
| 2012/0005557 A1 | 1/2012 | Mardiks et al. |
| 2012/0067626 A1 | 3/2012 | Mizutani |
| 2012/0260009 A1 | 10/2012 | Lu et al. |
| 2012/0260020 A1 | 10/2012 | Suryabudi et al. |
| 2012/0265737 A1 | 10/2012 | Potkonjak |
| 2012/0278531 A1 | 11/2012 | Horn |
| 2012/0284460 A1 | 11/2012 | Guda |
| 2012/0324191 A1 | 12/2012 | Strange et al. |
| 2013/0132638 A1 | 5/2013 | Horn et al. |
| 2013/0145106 A1 | 6/2013 | Kan |
| 2013/0290793 A1 | 10/2013 | Booth et al. |
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0223255 A1 | 8/2014 | Lu et al. |
| 2014/0281302 A1 | 9/2014 | Horn |
| 2014/0365785 A1 | 12/2014 | Deforest et al. |

OTHER PUBLICATIONS

Marvin R. Deforest, et al., U.S. Appl. No. 14/010,350, filed Aug. 26, 2013, 31 pages.

Robert L. Horn, U.S. Appl. No. 13/902,485, filed May 24, 2013, 40 pages.

International Search Report and Written Opinion dated Aug. 21, 2014 from related PCT Serial No. PCT/US2014/026701, 13 pages.

* cited by examiner

COMPRESSION AND FORMATTING OF DATA FOR DATA STORAGE SYSTEMS

CROSS REFERENCE TO RELATED APPLICATION

This application claims priority to a provisional U.S. Patent Application No. 61/798,909, filed on Mar. 15, 2013, the disclosure of which is hereby incorporated by reference in its entirety. This application is also related to co-pending U.S. patent application Ser. No. 13/902,485, entitled "MULTIPLE STREAM COMPRESSION AND FORMATTING OF DATA FOR DATA STORAGE SYSTEMS," filed on May 24, 2013, the disclosure of which is hereby incorporated by reference in its entirety.

BACKGROUND

1. Technical Field

This disclosure relates to data storage systems for computer systems. More particularly, the disclosure relates to compression and formatting of data for storage systems.

2. Description of the Related Art

Modern computer systems continually require increases in data storage system capacity, reliability, and performance. In 1981, a typical hard disk drive used in a personal computer had capacity of about 10 megabytes (MB). Today, capacities of hard disk drives are measured in terabytes (TB). Shingled magnetic recording is utilized in order to increase capacity of magnetic storage. In addition, modern disk drives often include solid state memory to increase performance. It is desirable to provide mechanisms and architectures for increasing capacity, reliability, and performance of data storage systems.

BRIEF DESCRIPTION OF THE DRAWINGS

Systems and methods that embody the various features of the invention will now be described with reference to the following drawings, in which.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions, and changes in the form of the methods and systems described herein may be made without departing from the scope of protection.

Overview

Data storage systems can utilize compression techniques in order to meet the demand for increased capacity, reliability, and performance. Compressing host system data before storing it in a data storage system typically causes compressed data to have smaller size than the original, non-compressed data provided by a host system. Accordingly, fixed sized host data units provided by the host system become variable sized data units after compression. Numerous challenges exist with storing and retrieving such variable sized data. For example, storing variable sized data in a data storage system media may necessitate making considerable changes to the way the data storage system stores data and keeps track of the stored data. As another example, because the host system usually expects fixed size data to be returned during data retrieval, considerable changes to data retrieval mechanisms may also be necessitated.

In some embodiments, mechanisms for compression and formatting of host data (or user data) for storing in data storage systems are provided. A data storage system can compress fixed sized data before storing it on a media and format obtained variable sized compressed data for storing on the media that typically has fixed size storage granularity, such as sectors for magnetic media and pages for non-volatile solid-state memory. One or more modules can compress incoming host data and create an output stream of fixed size "virtual" storage units (or storage units) containing one or more compressed host data units, error correction and detection code (EDC) information, and metadata for decoding the logical contents of the storage units. Virtual storage units serve as fixed sized containers for compressed host data.

In some embodiments, during writing of data to a data storage system, uncompressed, fixed sized host data units are grouped by adjacent logical addresses, stripped of EDC data, and compressed into one or more variable sized compressed data units. In order to maintain data protection and error detection and recovery, uncompressed data of a compressed data unit is used to determine new EDC that is appended to the compressed data unit. The compression logic also creates compressed data unit metadata that may include host logical addresses and length of compressed data. Compressed payload can include the metadata, determined EDC, and compressed host data. One or more compressed payloads, which can include one or more full or partial payloads, can be appended to create a fixed size virtual storage unit. The virtual storage unit can also include metadata for decoding the logical contents of the virtual storage unit. For example, the virtual storage unit metadata can include an offset of the first compressed mapping unit, a virtual data unit block address field, and a sequence number. Additional EDC data can be appended to the virtual storage unit. The virtual storage unit can be moved from a volatile memory buffer to the non-volatile media.

In some embodiments, reading stored data from the data storage system involves performing the inverse of writing data. Appropriate one or more virtual storage units are retrieved from the media and the data is decompressed. During decompression, the data storage system uses various elements of a virtual storage unit metadata and compressed payload metadata to unpack compressed data unit(s) that contain the required host data, decompress the compressed data unit(s), and generate uncompressed data in a fixed sized format expected by the host system. The data storage system can also use the metadata to verify that proper data units are being returned to the host system.

System Overview

Figure 1:
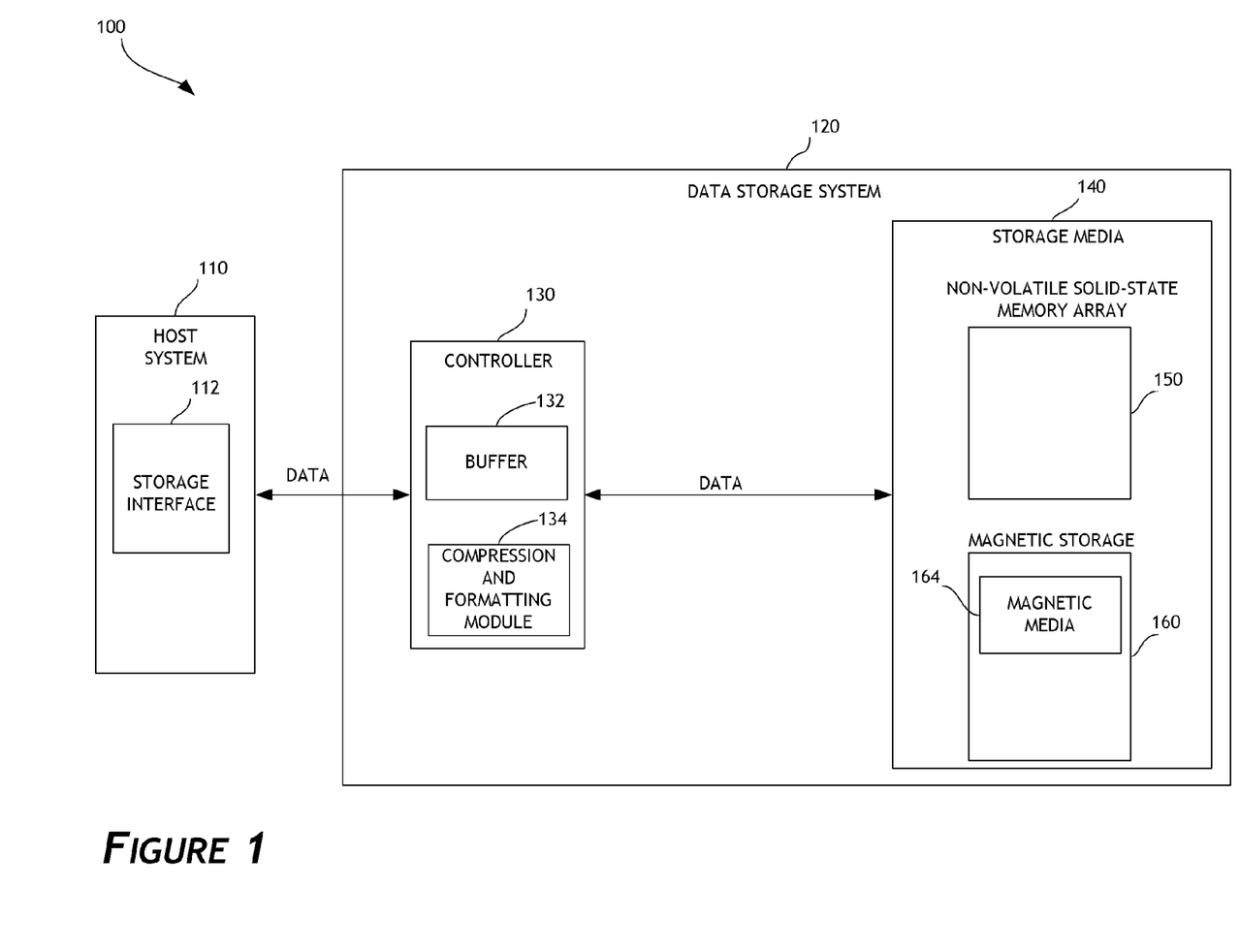
FIG. 1 illustrates a combination of a host system and a data storage system according to some embodiments of the invention.

FIG. 1 illustrates a combination 100 of a host system and a data storage system according to some embodiments of the invention. As is shown, the data storage system 120 (e.g., a solid-state drive) includes a controller 130 and storage media 140. Media 140 includes a non-volatile solid-state memory array 150. The solid-state memory array 150 may comprise flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof. Media 140 also includes magnetic storage 160, which comprises magnetic recording media 164. In one embodiment, magnetic storage 160 utilizes shingled magnetic recording. Storage media 140 can further comprise other types of storage. In some embodiments, the storage media 140 can comprise only one of solid-state memory array 140 or the magnetic storage 160.

The controller 130 can be configured to receive data and/or storage access commands from a storage interface module 112 (e.g., a device driver) of a host system 110. Storage access commands communicated by the storage interface 112 can include write data and read data commands issued by the host system 110. Read and write commands can specify a logical address (e.g., logical block addresses or LBAs) used to access the data storage system 120. The controller 130 can execute the received commands in the media 140.

Data storage system 120 can store data communicated by the host system 110. In other words, the data storage system 120 can act as memory storage for the host system 110. To facilitate this function, the controller 130 can implement a logical interface. The logical interface can present to the host system 110 data storage system's memory as a set of logical addresses (e.g., contiguous address) where user data can be stored. Internally, the controller 130 can map logical addresses to various physical locations or addresses in the media 140. The controller 130 includes a buffer 132, which can comprise volatile memory, such as random access memory (RAM) (e.g., DRAM, SRAM, etc.). In one embodiment, the buffer 132 is external to the controller 130. The controller 130 also includes a compression and formatting module 134 configured to compress and format host data for storing in the media 140, and decompress and format stored data for providing to the host system 110. The compression and formatting module 134 can utilize the buffer 132 for storing and retrieving data while performing compression and/or formatting tasks. In one embodiment, the compression and formatting module 134 is implemented in hardware, such as a system on-chip (SoC) hardware module. Hardware implementation can be realized using an application specific integrated circuit (ASIC), field-programmable gate array (FPGA), or a combination thereof. In another embodiment, the compression and formatting module 134 can be implemented in firmware or as a combination of hardware and firmware.

In some embodiments, the host system 110 stores in the data storage system 120 and the data storage system returns to the host system data formatted as one or more logical host data units. Logical host data units can span ranges of logical addresses, with each logical address corresponding to a physical location in the media 140. Host data units can be fixed sized data units of any suitable size, such as 512 bytes, 1024 bytes (1 KB), 2048 bytes (2 KB), 4096 bytes (4 KB), and the like. In one embodiment, 512 byte data units or sectors are utilized by the host system 110. In some embodiments, the media 140 is divided into fixed sized physical media storage units (or memory data units) of a suitable size, such as 512 bytes, 1024 bytes (1 KB), 2048 bytes (2 KB), 4096 bytes (4 KB), and the like. Physical media storage units can correspond to the smallest programmable and readable portion of memory and can span physical addresses of individual memory locations. In some embodiments, different media types include media storage units of different sizes. For example, the solid-state memory array 150 can be divided into dies, blocks, and pages, such as 2 KB pages, and the magnetic recording media 164 can be divided into tracks, clusters, and sectors, such as 512 byte sectors.

Compression and Formatting

Figure 2:
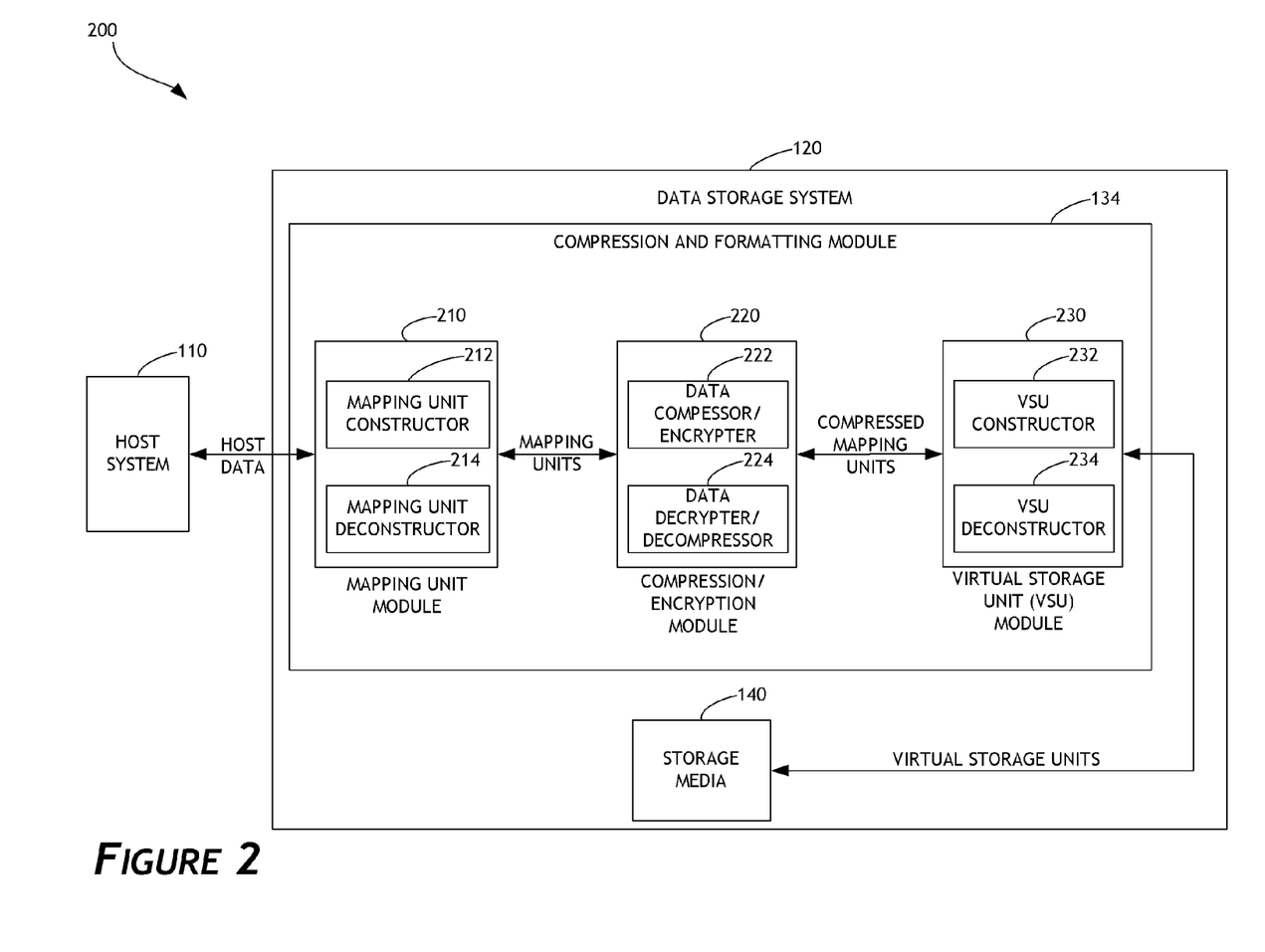
FIG. 2 illustrates compression and formatting utilized by a data storage system according to some embodiments of the invention.

FIG. 2 illustrates compression and formatting 200 utilized by the data storage system 120 according to some embodiments of the invention. The host system 110 provides host data (or user data) for storing in the data storage system 120. The host system 110 can provide host data in form of fixed sized host data units, such as 512 byte logical sectors. The host system 110 can provide host data as part of one or more write data commands. On the data storage system 120 side, the compression and formatting module 134 compresses and formats host data units for storage in the media 140.

In some embodiments, host data units are processed by a mapping unit module 210. A mapping unit can be selected as an integer multiple of the host data unit size, such as $N \times s_1$ or $s_1/N$, where $s_1$ is the host data unit size (e.g., 512 bytes) and N is an integer. The size of the mapping unit can be selected so as to achieve an optimal or substantially optimal balance between reduction of storage space gained from compression and latency associated with accessing compressed and formatted data stored in the media. In some embodiments, a mapping unit constructor 212 assembles one or more host data units into one or more mapping units. In some embodiments, the mapping unit constructor 212 assembles consecutive or sequential host data units into one or more mapping units. In one embodiment, consecutive or sequential host data units are associated with sequential logical addresses. In addition, aligned host data units of the size equal to the integer multiple size of the host data unit size can be stored into a mapping unit. For example, suppose that the host system 110 sends write data commands with host data units corresponding to 512-byte logical sectors 0-7, 8-15, and 16-23. Suppose that the mapping unit constructor 212 is configured to assemble aligned 4 KB of host data (or eight aligned 512-byte logical sectors) into a mapping unit, where "aligned" refers to alignments of the starting (and ending) logical addresses as well as the size. For the above example, the mapping unit constructor 212 generates three mapping units containing host data units for logical sectors 0-7, 8-15, and 16-23. Continuing the previous example, suppose that the host system 110 sends write data commands with host data units corresponding to logical sectors 1-8. These host data units are associated with eight logical sectors and have 4 KB aggregate size. However, these host data units are not aligned with chunks of eight logical sectors (e.g., a media storage unit boundary line is crossed). That is, the starting logical sector of these host data units is 1, not 0. Accordingly, the mapping unit constructor 212 generates two separate partial mapping units as discussed below: the first corresponding to logical sectors 1-7 and the second corresponding to logical sector 8. In some embodiments, the mapping units constructor 212 assembles non-aligned host data units into mapping units. In some embodiments, the mapping unit constructor 212 assembles non-consecutive or consecutive and non-consecutive host data units into mapping units.

In some embodiments, the mapping unit constructor 212 generates partial mapping units (or PMUs) that comprise less host data than the selected or target mapping unit size. For example, suppose that the host system sends write data commands with host data units corresponding to 512-byte logical sectors, 0-10 and that the mapping unit constructor 212 is configured to assemble aligned 4 KB of host data (or eight aligned 512-byte logical sectors) into a mapping unit. The mapping unit constructor 212 generates a first full or complete mapping unit corresponding to host data units for logical sectors 0-7 and a second partial mapping unit corresponding to host data units for logical sectors 8-10. Partial mapping unit corresponding to data associated with logical sector 8-10 can be later integrated into a full mapping unit when the host system 110 writes data into logical sectors 11-15.

In some embodiments, mapping units (full or partial) constructed by the mapping unit module 210 are compressed, and optionally encrypted, by the compression and encryption module 220. In some embodiments, a data compression module 222 first compresses and then, optionally, encrypts the compressed data. Encryption is performed after compression as encrypted data is randomized and may not be compressible. In some embodiments, lossless compression is used, such as Lempel-Ziv-Welch (LZW) compression. Compressed mapping unit(s) generated by the data compression module 222 can be referred to as compressed payload. In some embodiments, partial mapping units are not compressed in order to make later integration into full mapping units more efficient. In some embodiments, full mapping units are not compressed. For example, one uncompressed mapping unit can be stored as a virtual storage unit, as explained below.

In some embodiments, compressed (and optionally encrypted) mapping unit data has a size that is smaller (or equal) than that of an uncompressed mapping unit. Accordingly, compressed mapping units can have variable size. However, as explained above, the media 140 can have fixed size storage granularity, such as fixed sized media storage units (or memory data units). For example, the solid-state memory array 150 can comprise memory pages, with a page being the smallest programmable and/or retrievable memory unit. As another example, the magnetic recording media 164 can comprise sectors, with a sector being the smallest programmable and/or retrievable memory unit. Compressed mapping units are provided to the virtual storage unit module 230 that assembles one or more compressed mapping units (or, in some embodiments, uncompressed mapping units) into fixed sized storage units for storing in the media.

In some embodiments, a virtual storage unit constructor 232 is configured to assemble compressed mapping units into virtual storage units having a size that is aligned with the size of the media storage unit. For example, the size of the virtual storage unit can be an integer multiple of the media storage unit, such as $N \times s_2$ or $s_2/N$, where $s_2$ is the media storage unit size and N is an integer. In one embodiment, the size of the virtual storage unit is the same as the size of the media storage unit, such as 4 KB. In another embodiment, the size of the virtual storage unit is selected such that one or more compressed mapping units are assembled into a virtual storage unit. In some embodiments, different sizes of media storage units can be utilized for different types of media. As is illustrated in FIG. 1, the data storage system 120 includes solid-state memory 140 and magnetic storage 160, which can have different sizes of media storage units. For example, solid-state memory 140 can include memory pages that are 8 KB in size, while the magnetic recording media 164 can include 4 KB sectors. The virtual storage unit constructor 232 can assemble two types of virtual storage units: 8 KB storage unit for being programmed in the solid-state memory 140 and 4 KB storage unit for being written in the magnetic recording media 164.

In some embodiments, a virtual storage unit that includes one or more compressed (or uncompressed) data units is padded with filler data so that the size of the virtual storage unit is aligned with the size of a corresponding media storage unit (e.g., corresponding to the media where the virtual storage unit will be stored). For example, suppose that the size of a compressed mapping unit is 3.5 KB and 4 KB virtual storage units are used. The virtual storage unit constructor 232 can assemble 3.5 KB compressed mapping unit along with 0.5 KB (or 512 bytes) of filler data into a virtual storage unit. As another example, suppose that the combined size of two compressed mapping units is 3.7 KB and 4 KB virtual storage units are used. The virtual storage unit constructor 232 can assemble the two compressed mapping units having combined size of 3.7 KB along with 0.3 KB of filler data into a virtual storage unit. Filler data can comprise one or more suitable values, such as all zero values.

In some embodiments, compressed mapping units can be split across multiple virtual storage units. Compressed mapping units can include compressed payload or uncompressed payload (e.g., partial mapping unit payload may not be compressed). For example, suppose that a first compressed mapping unit is sized 1 KB, a second compressed mapping unit is sized 3.5 KB, a third compressed mapping unit is sized 3 KB, and 4 KB virtual storage units are used. The virtual storage unit constructor 232 can assemble the first compressed mapping unit (sized 1 KB) and 3 KB of the second compressed mapping unit (or split compressed mapping unit) into a first virtual storage unit. Further, the virtual storage unit constructor 232 can assemble the remaining 0.5 KB of the second compressed mapping unit (or remainder compressed mapping unit), third compressed mapping unit (sized 3 KB), and 0.5 KB of filler data into a second virtual storage unit. In some embodiments, compressed mapping units are split across sequential virtual storage units. In other embodiments, compressed mapping units are split across non-sequential virtual storage units.

In some embodiments, multiple compressed mapping units assembled into a virtual storage unit include only sequential host data units. For example, a first compressed mapping unit that includes host data units corresponding to logical 512-byte sectors 0-7 and a second compressed mapping unit that includes host data units corresponding to logical sectors 8-15 are combined into a virtual storage unit. In some embodiments, virtual storage units can include non-sequential host data units. For example, a first compressed mapping unit that includes host data units corresponding to logical sectors 0-7 and a second compressed mapping unit that includes host data units corresponding to logical sectors 32-39 are combined into a virtual storage unit.

In some embodiments, the mapping unit module 210, compression and encryption module 220, and virtual storage unit module 230 operate on data stored in the buffer 132. That is, mapping units, compressed mapping units, and virtual storage units are created and manipulated in the buffer 132. Assembled virtual storage units can be stored in the non-volatile media 140.

In some embodiments, reading data comprises performing the inverse of the operations associated with writing data. In response to a read data command received from the host system, the command including logical addresses for host data to be retrieved, the virtual storage unit deconstructor 234 identifies or locates in the media 140 (and/or in the buffer 132) one or more virtual storage units with the host data to be retrieved. As explained below, the virtual storage unit deconstructor 234 can use mapping data for performing the identification. The virtual storage unit deconstructor 234 identifies one or more compressed mapping units from the retrieved one or more virtual storage units, the one or more compressed mapping units containing host data to be retrieved. Data decrypter and decompressor 224 decrypts (if the data is encrypted) and decompresses (if the data is compressed) the payloads of the one or more compressed mapping units to obtain one or more mapping units containing host data to be retrieved. Mapping unit deconstructor 214 unpacks host data to be retrieved from the one or more mapping units. Host data to be retrieved is returned to the host system 110.

In some embodiments, one or more of the mapping unit module 210, compression and encryption module 220, and virtual storage unit module 230 are implemented in hardware, such as in one or more a system on-chip (SoC) hardware modules. Hardware implementation can be realized using an application specific integrated circuit (ASIC), field-programmable gate array (FPGA), or a combination thereof. In another embodiment, modules 210, 220, and 230 can be implemented in firmware or as a combination of hardware and firmware.

Figure 3:
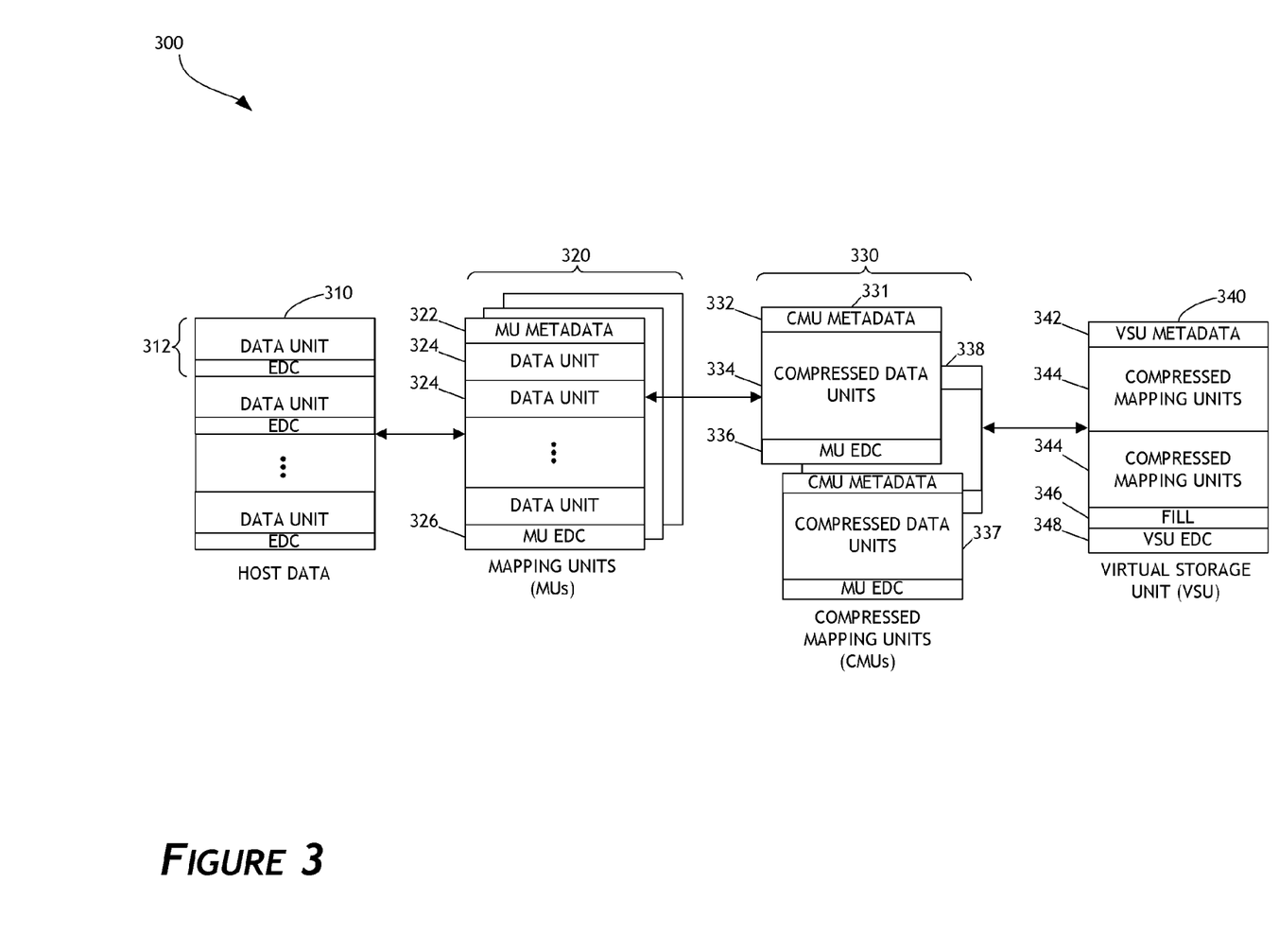
FIG. 3 illustrates compression and formatting data flow utilized by a data storage system according to some embodiments of the invention.

FIG. 3 illustrates compression and formatting data flow 300 utilized by a data storage system according to some embodiments of the invention. The data flow 300 can be implemented by the controller 130 and/or the compression and formatting module 134. Host data 310 is received from the host system 110 as a set of host data units 312. In one embodiment, a host data unit 312 is a logical sector, such as a 512-byte logical sector. A host data unit 312 includes host (or user) data and error correction and detection (EDC) data that enables error detection and/or reconstruction of the host data. In one embodiment, EDC data can be parity data checksum, cyclic redundancy check (CRC) data, or a suitable error correction code. In one embodiment, a 512-byte logical sector of host data includes 4 bytes of EDC data.

In some embodiments, host data 310 is assembled into one or more mapping units 320 as discussed above. This can be performed by the mapping unit module 210. As explained above, a mapping unit 320 can be selected as an integer multiple of the host data unit size. In some embodiments, a mapping unit 320 includes one or more host data units 324 (which collectively make up a mapping unit payload), mapping unit metadata 322, and mapping unit EDC 326. Mapping unit metadata 322 can include the following information: payload type (e.g., compressed or uncompressed), count (or number) of host data units in the payload, logical addresses of one or more host data units in the payload, and payload length. In other embodiments, metadata 322 can include additional or alternative fields. In some embodiments, when the mapping unit module 210 assembles sequential host data units into a mapping unit, the logical address of the first host data unit in the payload and the host data unit size are sufficient to identify and locate all host data units in the payload. For example, if host data units corresponding to 512-byte logical sectors 0-7 are assembled into a 4 KB mapping unit, starting logical address associated with logical sector 0 and logical sector size (512 bytes) are sufficient to describe all logical sectors. The count of the host units in the payload in this case is set to 8. As another example, if host data units corresponding to 512-byte logical sectors 0-4 are assembled into a partial mapping unit, the count of the host units in the payload is set to 5.

In some embodiments, mapping unit EDC 326 is calculated for the entire payload of the mapping unit. The size of the mapping unit EDC 326 is smaller than the aggregate size of EDC data associated with the host data units 324 in the payload. For example, suppose that 512-byte logical sector of host data includes 4 bytes of EDC data and 8 logical sectors (or 4 KB) are assembled into a mapping unit 320. A 4-byte mapping unit EDC 326 can be generated, which results in a 28 byte savings as compared to the aggregate size of EDC data (32 bytes) for the host data units in the payload. In some embodiments, this saving of space allows for including metadata 322 into the mapping unit 320 without taking up any additional space. In some embodiments, mapping unit EDC 326 is seeded by the starting logical address of the payload.

In some embodiments, mapping units 320 are compressed, and optionally encrypted, to produce one or more compressed mapping units 330 as discussed above. This can be performed by the compression and encryption module 220. A compressed mapping unit, such as mapping units 331, 337, or 338, includes compressed payload 334 (corresponding to the compressed mapping unit), compressed mapping unit metadata 332, and mapping unit EDC 336, which can be the same as EDC 326. Mapping unit metadata 332 can include the following information: payload type (e.g., compressed or uncompressed), count (or number) of host data units in the compressed payload, logical addresses of one or more host data units in the compressed payload, and compressed payload length. In other embodiments, metadata 332 can include additional or alternative fields. Because compression produces variable sized data, compressed payload length field can be different for two or more different compressed mapping units, such as compressed mapping units 331, 337, and 338. In some embodiments, when sequential host data units are assembled into a mapping unit and into the compressed payload, the logical address of the first host data unit in the compressed payload and the host data unit size are sufficient to describe all host data in the compressed payload.

In some embodiments, when encryption is performed after compression, the compressed payload 334 and the mapping unit EDC 336 are encrypted. The metadata 332 is not encrypted or compressed. The metadata 332 can describe the contents of compressed payload, including describing logical addresses associated with host data in the compressed payload. Because in some embodiments, the host system 110 provides the decryption and/or encryption key(s) to the data storage system 120, not encrypting the metadata 332 allows the data storage system to manipulate compressed payload for various background or housekeeping tasks without having to perform decryption first. For example, the data storage system 120 can perform garbage collection without having to obtain the decryption key(s) from the host system 110. Garbage collection can include omitting or removing from a virtual storage unit one or more mapping units having invalid data. For example, suppose that a virtual storage unit includes mapping units for host data units corresponding to 512-byte logical sectors 0-7. Suppose further that as a result of host system activity, host data stored in logical sector 3 is updated, thereby making data in the virtual storage unit corresponding to logical sector 3 invalid. Garbage collection operation can create a new virtual storage unit that includes mapping units corresponding to logical sectors 0-2 and 4-7. As another example, the data storage system 120 can repack compressed payload without the decryption key(s). Repacking can include defragmentation of compressed payload, such as assembling partial mapping units into full mapping units, format conversion, such as storing virtual storage unit payload in a virtual storage unit of a different size for storage on different type of media, and the like. Defragmentation can include reordering the mapping units for host data units in a virtual storage unit. For example, suppose that a virtual storage unit includes mapping units for host data units corresponding to 512-byte logical sectors 0, 1, 3, 2, and 4-7. Defragmentation operation can reorder the mappings units in the virtual sector so that the mapping units are arranged in the order corresponding to host data units for logical sectors 0-7. In some embodiments, defragmentation can be performed in conjunction with garbage collection. For example, suppose that a virtual storage unit includes mapping units for host data units corresponding to 512-byte logical sectors 0, 1, 2, 4, 3, and 5-7. Suppose further that as a result of host system activity, host data stored in logical sector 2 is updated, thereby making data in the virtual storage unit corresponding to logical sector 2 invalid. Performing garbage collection in conjunction with defragmentation can create a new virtual storage unit that includes mapping units corresponding to logical sectors 0, 1, 3, 4, 5, 6, and 7 in that order. In some embodiments, the metadata 332 is encrypted and/or compressed.

In some embodiments, partial, full, and/or multiple compressed/uncompressed mapping units are assembled into a virtual storage unit 340. This can be performed by the virtual storage unit module 230. In some embodiments, virtual storage units can include one or more of the following: uncompressed mapping unit(s) (full and/or partial), parts (split/remainder parts) of one or more compressed mapping units split across several virtual storage units, compressed mapping unit(s), filler data, and so on. In the illustrated example, the virtual storage unit 340 comprises one or more full or partial compressed mapping units 344 (collectively making up compressed payload), optional filler data 346 so that the size of the virtual storage unit is aligned with the size of a corresponding media storage unit, virtual storage unit metadata 342, and virtual storage unit EDC 348 determined for the contents of the virtual storage unit. Virtual storage unit metadata 342 can include the following information: virtual storage unit logical address for identifying the physical location of the virtual storage unit in the media 140, offset within the virtual storage unit of metadata field of the first compressed mapping unit in the compressed payload, and a sequence number of the virtual storage unit (or another form of a timestamp). In other embodiments, metadata 342 can include additional or alternative fields.

In some embodiments, returning stored data to the host system 110 comprises performing the inverse of the operations associated with writing data. In response to a read data command received from the host system, the command including logical addresses for the host data to be retrieved, the virtual storage unit module 230 identifies or locates in the media 140 (and/or in the buffer 132) one or more virtual storage units 340 with the host data to be retrieved. In some embodiments, the virtual unit storage unit module 230 utilizes a mapping table (or another suitable data structure) that reflects associations between the logical addresses used by the host system 110 for addressing data stored in the data storage system 120 and virtual storage units storing data associated with the logical addresses. The virtual storage unit module 230 can also use virtual storage unit metadata 342 to identify and retrieve from the media (and/or from the buffer) virtual storage units with the host data to be retrieved.

Using the metadata 332, the virtual storage unit module 230 identifies one or more compressed mapping units from the retrieved one or more virtual storage units, the one or more compressed mapping units containing host data to be retrieved. In some embodiments, a retrieved virtual storage unit can include one or more compressed mapping units that contain host data to be retrieved as well as one or more compressed mapping units that do not contain sought after host data. This classification can be performed using the metadata fields of the compressed mapping units. In such cases, one or more mapping units that do not contain host data to be retrieved are skipped, thereby improving efficiency of the data transfer operation. For example, suppose that the host system 110 requested host data corresponding to logical sector 3, but a retrieved mapping unit contains host data corresponding to logical sectors 0-7. The data storage system can return host data corresponding only to logical sector 3. As another example, suppose that the host system 110 requested host data corresponding to logical sectors 0-7, and a first retrieved mapping unit contains host data corresponding to logical sectors 0-7. Suppose further that a second mapping unit contains a "fresh" (or latest) copy of host data corresponding to logical sector 3. The data storage system can return host data contained in the first mapping unit for logical sectors 0-2 and 4-7 (thereby skipping host data for logical sector 3 contained in the first mapping unit) and return host data contained in the second mapping unit for logical sector 3. Data compression and encryption module 220 decrypts (if the data is encrypted) and decompresses (if the data is compressed) one or more compressed mapping units that contain host data to be retrieved. Mapping unit module 210 unpacks host data to be retrieved from the obtained one or more mapping units. Host data to be retrieved is returned to the host system 110. In some embodiments, mapping unit metadata 322 is used to ensure that correct data is returned to the host system 110.

The above described packing schemes used in one or more embodiments are particularly useful in a mixed media environment where several types of media are present in the data storage system (e.g., a hybrid hard disk with solid state memory). As the media types have various physical sector/memory unit sizes, the package schemes enable packing characteristics to be easily adjusted across the media sizes. Thus, a controller employing the packing schemes can service the mixed media storage components and handle migration of data from one media component to another, while fulfilling the requirements of a compression and encryption-based system. For example, the virtual storage unit size can be adjusted depending on the storage destination. In one embodiment, the migration can be performed seamlessly, with repacking, if any, being handled automatically inline. Also, in one embodiment the packing/unpacking processing (including the necessary metadata handling, data mapping, compression, decompression, encryption, decryption) is automated in hardware, further enhancing the performance of the overall system.

Processes for Writing and Reading Data

Figure 4:
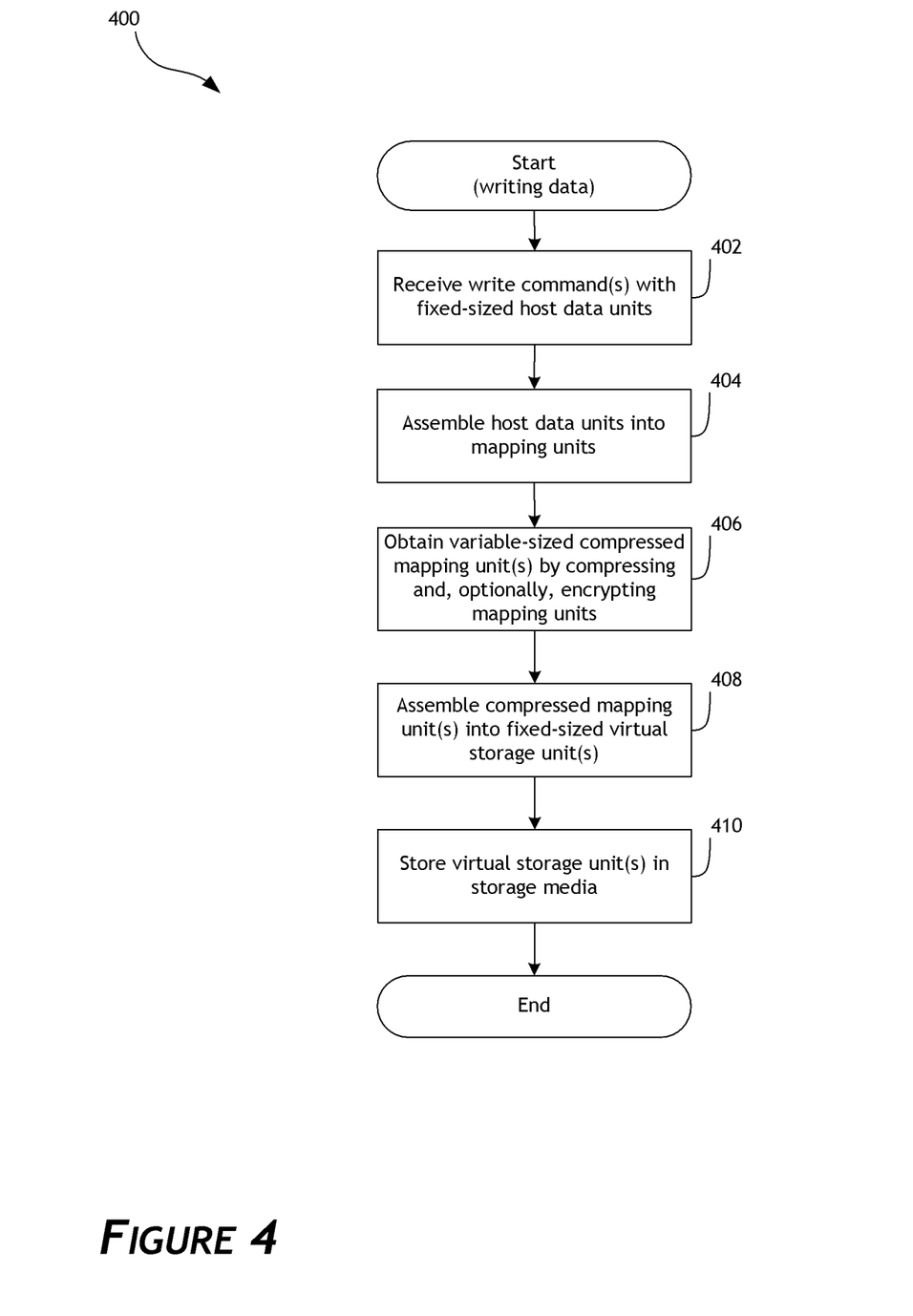
FIG. 4 is a flow diagram illustrating a process of storing data in a data storage system according to some embodiments of the invention.

FIG. 4 is a flow diagram illustrating a process 400 of writing or programming data in the data storage system 120 according to some embodiments of the invention. The illustrated process can be executed by the controller 130 and/or the compression and formatting module 134. In block 402, the process 400 receives one or more write data commands from a host system 110. A write data command specifies one or more host data units to be written to corresponding logical addresses. Host data units have fixed size. The process 400 transitions to block 404 where it assembles the one or more host data units into one or more mapping units. In some embodiments, sequential and aligned (e.g., not crossing a host data unit alignment boundary) host data units are assembled into full mapping units. The process 400 transitions to block 406 where it compresses the one or more mapping units, thereby obtaining compressed mapping units, which are variable sized due to the compression operation. The process 400 optionally encrypts the compressed data. In block 408, the process 400 assembles the one or more compressed mapping units into one or more fixed sized virtual storage units. In block 410, the process 400 stores the assembled one or more virtual storage units in the media 140.

Figure 5:
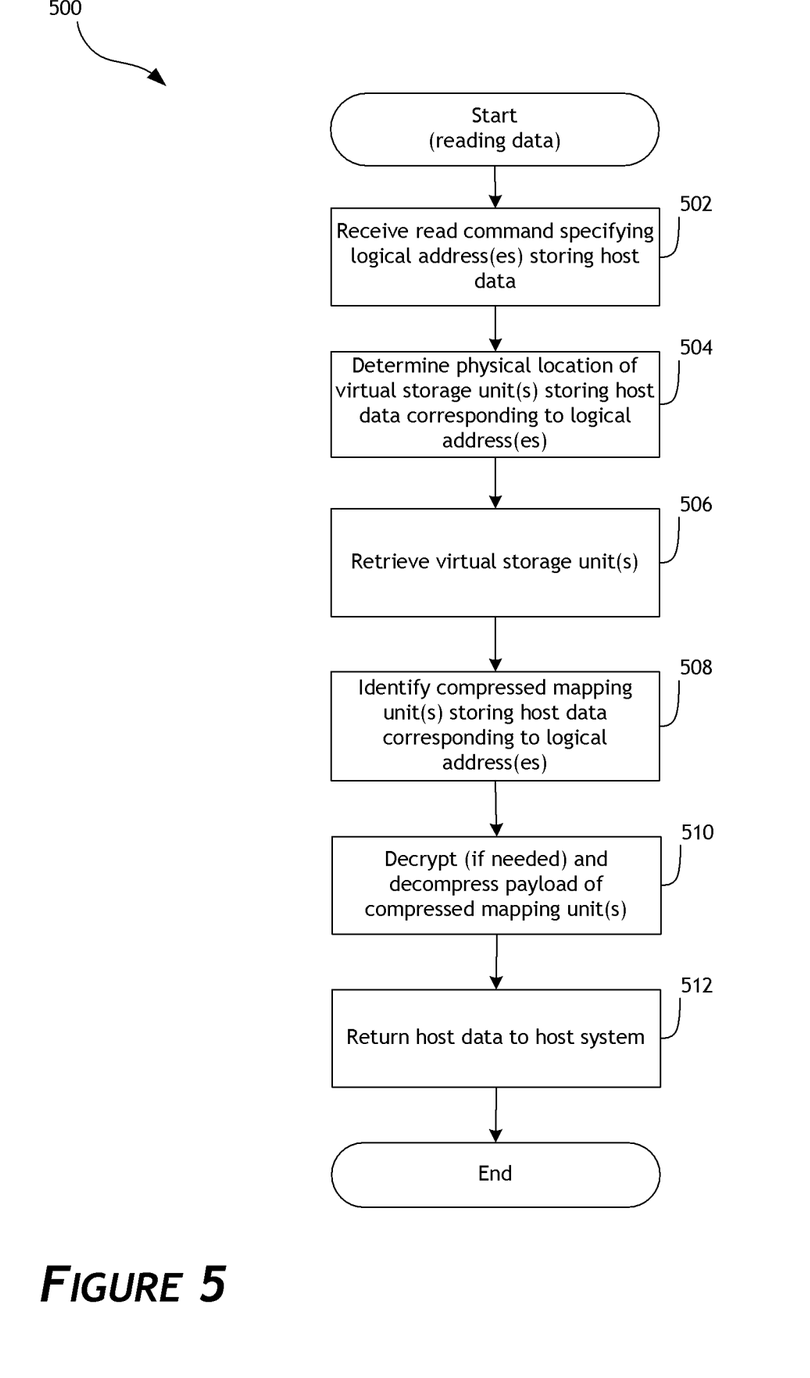
FIG. 5 is a flow diagram illustrating a process of retrieving data stored in a data storage system according to some embodiments of the invention.

FIG. 5 is a flow diagram illustrating a process 500 of reading or retrieving stored data from the data storage system 120 according to some embodiments of the invention. The illustrated process can be executed by the controller 130 and/or the compression and formatting module 134. In block 502, the process 500 receives a read command from the host system 100, the read command specifying a range of logical addresses associated with host data stored in the data storage system 120. The process 500 transitions to block 504, where it identifies one or more virtual storage units that contain host data to be retrieved. In block 506, the process 500 retrieves the identified one or more virtual storage units from the media (and/or buffer). The process 500 transitions to block 508, where it identifies or locates in the one or more retrieved virtual storage units one or more compressed mapping units whose payloads contain host data to be retrieved. As explained above, the process 500 can skip compressed mapping units whose payload does not contain host data to be retrieved. The process 500 transitions to block 510, where it decrypts (if the payload is encrypted) and decompresses (if the payload is compressed) the payloads of the identified one or more compressed mapping units. In block 512, the process 500 unpacks the host data to be retrieved and returns the data to the host system 110.

CONCLUSION

Disclosed approaches for compression and formatting of data for data storage systems can increase capacity, reliability, and performance. In some embodiments, the throughput as measured by data write and/or read rates is increased because compressed data which is smaller in size is stored and retrieved from the media. Because read rates are increased, resume time of the host system can be decreased. This allows the host system to "wake up" faster following power on, reboot, sleep, and/or hibernate events. In some embodiments, storing compressed data increases the effective capacity of the media. This can also reduce costs as, for example, less solid-state cache memory may be needed, and increase cache hit rates and overall performance. In some embodiments, particularly for solid-state memory media, lower write amplification and increased overprovisioning are achieved.

Other Variations

Those skilled in the art will appreciate that in some embodiments, additional or alternative modules can be used to perform compression and formatting. Mapping units, compressed mapping units, and/or virtual storage units can include additional or alternative fields. The actual steps taken in the disclosed processes, such as the processes illustrated in FIGS. 4 and 5, may differ from those shown in the figures. Additional system components can be utilized, and disclosed system components can be combined or omitted. Depending on the embodiment, certain of the steps described above may be removed, others may be added.

While certain embodiments have been described, these embodiments have been presented by way of example only, and are not intended to limit the scope of the protection. Indeed, the novel methods and systems described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection. For example, the systems and methods disclosed herein can be applied to hard disk drives, hybrid hard drives, and the like. In addition, other forms of storage (e.g., DRAM or SRAM, battery backed-up volatile DRAM or SRAM devices, EPROM, EEPROM memory, etc.) may additionally or alternatively be used. As another example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A data storage system comprising:
   non-volatile memory (NVM) configured to store a plurality of memory data units, a memory data unit being a unit of storage in the NVM; and
   a controller configured to:
      in response to a write data command received from a host system, the command associated with a plurality of host data units associated with a plurality of logical addresses:
         compress the plurality of host data units to obtain a compressed payload, wherein a size of the compressed payload is smaller than or equal to a size of the plurality of host data units;
         assemble the compressed payload into a compressed mapping unit;
         assemble the compressed mapping unit along with one or more additional compressed mapping units into a storage unit, wherein a size of the storage unit is aligned with the size of the memory data unit;
         generate a storage unit metadata portion indicating a position in the storage unit of at least one of the compressed mapping unit or the one or more additional compressed mapping units;
         include the metadata portion in the storage unit; and
         store the storage unit in the NVM.

2. The data storage system of claim 1, wherein the plurality of host data units are associated with a plurality of consecutive logical addresses.

3. The data storage system of claim 1, wherein the controller is further configured to encrypt the compressed payload.

4. The data storage system of claim 1, wherein the compressed mapping unit comprises a compressed mapping unit metadata portion indicating the plurality of logical addresses associated with data of the compressed payload.

5. The data storage system of claim 4, wherein the compressed mapping unit metadata portion is not compressed.

6. The data storage system of claim 4, wherein the compressed mapping unit metadata portion is not compressed and is not encrypted.

7. The data storage system of claim 6, wherein the controller is further configured to encrypt the compressed payload.

8. The data storage system of claim 7, wherein the controller is further configured to repack, using the compressed mapping unit metadata portion, the compressed payload without decrypting the compressed payload.

9. The data storage system of claim 7, wherein the repacking is associated with the controller performing at least one of defragmentation of data stored in the NVM, garbage collection of data stored in the NVM, or assembling of the compressed payload into another storage unit of a different size than the size of the storage unit.

10. The data storage system of claim 1, wherein the one or more additional compressed mapping units in the storage unit comprise host data units associated with one or more additional write data commands.

11. The data storage system of claim 1, wherein the controller is further configured to include filler data in the storage unit, a size of the filler data selected such that the size of the storage unit is aligned with the size of the memory data unit.

12. The data storage system of claim 1 further comprising a buffer, wherein the controller is further configured to use the buffer to:
compress the plurality of host data units to obtain the compressed payload;
assemble the compressed payload into the compressed mapping unit;
assemble the compressed mapping unit along with the one or more additional compressed mapping units into the storage unit; and
transfer the storage unit from the buffer to the NVM.

13. The data storage system of claim 1, wherein the controller comprises one or more hardware modules configured to:
compress the plurality of host data units to obtain the compressed payload;
assemble the compressed payload into the compressed mapping unit; and
assemble the compressed mapping unit along with the one or more additional compressed mapping units into the storage unit.

14. The data storage system of claim 1, wherein the NVM comprises at least one of a solid-state memory array or magnetic recording media.

15. The data storage system of claim 14, wherein the solid-state memory array is configured to store a plurality of memory data units of a first size and the magnetic recording media is configured to store a plurality of a memory data units of a second size, and the size of the storage unit is aligned with the first size or the second size based at least in part on whether the storage unit is to be stored in the solid-state memory array or the magnetic recording media.

16. The data storage system of claim 15, wherein the controller is further configured to pad the storage unit with filler data, a size of the filler data selected such that the size of the storage unit is aligned with the first size or the second size.

17. The data storage system of claim 1, wherein the controller is further configured to:
in response to a read data command received from the host system, the command associated with a range of logical addresses corresponding to a memory data unit comprising a plurality of host data units:
identify and retrieve one or more storage units stored in the NVM that include the plurality of host data units associated with the read data command;
identify one or more compressed mapping units of the retrieved one or more storage units, wherein combined compressed payloads of the one or more compressed mapping units comprise at least the plurality of host data units associated with the read data command;
decompress the compressed payloads of the identified one or more compressed mapping units; and
return the plurality of host data units obtained from the decompressed payloads to the host system.

18. The data storage system of claim 17, wherein each compressed mapping unit comprises a compressed mapping unit metadata portion indicating a plurality of logical addresses associated with host data of the compressed payload, and the controller is further configured to identify the one or more compressed mapping units using their compressed mapping unit metadata portions.

19. The data storage system of claim 18, wherein compressed mapping unit metadata portions for each compressed mapping unit are not compressed.

20. The data storage system of claim 18, wherein each compressed mapping unit comprises an uncompressed and unencrypted metadata portion.

21. The data storage system of claim 18, wherein the controller is further configured to skip, within the retrieved one or more storage units, an unrelated compressed mapping unit having a compressed mapping unit metadata portion that does not indicate that the compressed mapping unit includes host data units that correspond to any of logical addresses in the logical address range associated with the read data command.

22. The data storage system of claim 1, wherein the controller is further configured to store a first portion of the compressed mapping unit into a first storage unit and store a second portion of the compressed mapping unit into a second storage unit.

23. The data storage system of claim 1, wherein the controller is further configured to store the plurality of host data units into the compressed mapping unit, and store a first portion of the compressed mapping unit into a first storage unit and store a second portion of the compressed mapping unit into second storage unit.

24. The data storage system of claim 1, wherein the write data command is associated with a plurality of error correction and detection codes corresponding to the plurality of host data units, and the controller is further configured to generate an aggregate error correction and detection code corresponding to the plurality of host data units, a size of the aggregate error correction and detection code data being smaller than a combined size of the one or more error correction and detection codes.

25. A method of storing data in a non-volatile storage system comprising a non-volatile memory (NVM) configured to store a plurality of memory data units, a memory data unit being a unit of storage in the NVM, the method comprising:
  in response to receiving a write data command from a host system, the command associated with a plurality of host data units associated with a plurality of logical addresses:
    compressing the plurality of host data units to obtain a compressed payload, wherein a size of the compressed payload is smaller or equal to a size of the plurality of host data units;
    assembling the compressed payload into a compressed mapping unit;
    assembling the compressed mapping unit along with one or more additional compressed mapping units into a storage unit, wherein a size of the storage unit is aligned with the size of the memory data unit;
    generating a storage unit metadata portion indicating a position in the storage unit of at least one of the compressed mapping unit or the one or more additional compressed mapping units;
    including the metadata portion in the storage unit; and
    storing the storage unit in the NVM,
  wherein the method is performed under control of a controller.

26. The method of claim 25, wherein the plurality of host data units are associated with a plurality of sequential logical addresses.

27. The method of claim 25, further comprising encrypting the compressed payload.

28. The method of claim 25, wherein the compressed mapping unit comprises a compressed mapping unit metadata portion indicating the plurality of logical addresses associated with data of the compressed payload.

29. The method of claim 28, wherein the compressed mapping unit metadata portion is not compressed.

30. The method of claim 28, wherein the compressed mapping unit metadata portion is not compressed and is not encrypted.

31. The method of claim 30, further comprising encrypting the compressed payload.

32. The method of claim 31, further comprising repacking, using the compressed mapping unit metadata portion, the compressed payload without decrypting the compressed payload.

33. The method of claim 31, wherein the repacking is associated with at least one of defragmenting data stored in the NVM, garbage collecting data stored in the NVM, or assembling of the compressed payload into another storage unit of a different size than the size of the storage unit.

34. The method of claim 25, wherein the one or more additional compressed mapping units in the storage unit comprise host data units associated with one or more additional write data commands.

35. The method of claim 25, further including filler data in the storage unit, a size of the filler data selected such that the size of the storage unit is aligned with the size of the memory data unit.

36. The method of claim 25, wherein the NVM comprises at least one of a solid-state memory array and magnetic recording media.

37. The method of claim 36, wherein the solid-state memory array is configured to store a plurality of memory data units of a first size and the magnetic recording media is configured to store a plurality of a memory data units of a second size, and the size of the storage unit is aligned with the first size or the second size based at least in part on whether the storage unit is to be stored in the solid-state memory array or the magnetic recording media.

38. The method of claim 37, further comprising padding the storage unit with filler data, a size of the filler data selected such that the size of the storage unit is aligned with the first size or the second size.

39. The method of claim 25, further comprising:
  in response to receiving a read data command from the host system, the command associated with a range of logical addresses corresponding to a memory data unit comprising a plurality of host data units:
    identifying and retrieving one or more storage units stored in the NVM that include the plurality of host data units associated with the read data command;
    identifying one or more compressed mapping units of the retrieved one or more storage units, wherein combined compressed payloads of the one or more compressed mapping units comprise at least the plurality of host data units associated with the read data command;
    decompressing the compressed payloads of the identified one or more compressed mapping units; and
    returning the plurality of host data units obtained from the decompressed payloads to the host system.

40. The method of claim 39, wherein each compressed mapping unit comprises a compressed mapping unit metadata portion indicating a plurality of logical addresses associated with host data of the compressed payload, and the controller is configured to identify the one or more compressed mapping units using their compressed mapping unit metadata portions.

41. The method of claim 40, wherein each compressed mapping unit comprises an uncompressed metadata portion.

42. The method of claim 40, wherein compressed mapping unit metadata portions for each compressed mapping unit are not compressed.

43. The method of claim 40, further comprising skipping, within the retrieved one or more storage units, an unrelated compressed mapping unit having a metadata portion that does not indicate that the compressed mapping unit includes host data units that correspond to any of logical addresses in the logical address range associated with the read data command.

44. The method of claim 25, further comprising storing a first portion of the compressed mapping unit into a first storage unit and storing a second portion of the compressed mapping unit into a second storage unit.

45. The method of claim 25, further comprising storing the plurality of host data units into the compressed mapping unit, and storing a first portion of the compressed mapping unit into a first storage unit and storing a second portion of the mapping unit into a second storage unit.

46. The method of claim 25, wherein the write data command is associated with a plurality of error correction and detection codes corresponding to the plurality of host data units, and the method further comprises generating an aggregate error correction and detection code corresponding to the plurality of host data units, a size of the aggregate error correction and detection code data being smaller than a combined size of the one or more error correction and detection codes.

47. The data storage system of claim 1, wherein the size of the storage unit is an integer multiple of the size of the memory data unit.

48. The method of claim 25, wherein the size of the storage unit is an integer multiple of the size of the memory data unit.

* * * * *

UNITED STATES PATENT AND TRADEMARK OFFICE
CERTIFICATE OF CORRECTION

PATENT NO. : 9,448,738 B2  
APPLICATION NO. : 13/902504  
DATED : September 20, 2016  
INVENTOR(S) : Robert L. Horn Page 1 of 1

It is certified that error appears in the above-identified patent and that said Letters Patent is hereby corrected as shown below:

On the Title Page

In Column 2 item (56) at Line 10, Under Other Publications, change "PCT/US20141026863," to --PCT/US2014/026863,--.

In the Drawings

Sheet 2 of 5 (Reference Numeral 222, FIGURE 2) at Line 2, Change "COMPESSOR/" to --COMPRESSOR/--.

Signed and Sealed this  
Thirteenth Day of March, 2018

Andrei Iancu  
*Director of the United States Patent and Trademark Office*